(12) United States Patent
Stewart et al.

(10) Patent No.: US 12,413,568 B2
(45) Date of Patent: Sep. 9, 2025

(54) METHOD AND SYSTEM FOR DISTRIBUTING KEYS

(71) Applicants: Advanced Micro Devices, Inc., Santa Clara, CA (US); ATI Technologies ULC, Markham (CA)

(72) Inventors: Norman Vernon Douglas Stewart, Markham (CA); Mihir Shaileshbhai Doctor, Santa Clara, CA (US); Omar Fakhri Ahmed, Markham (CA); Hemaprabhu Jayanna, Santa Clara, CA (US); John Traver, Santa Clara, CA (US)

(73) Assignees: Advanced Micro Devices, Inc., Santa Clara, CA (US); ATI Technologies ULC, Ontario (CA)

( * ) Notice: Subject to any disclaimer, the term of this patent is extended or adjusted under 35 U.S.C. 154(b) by 134 days.

(21) Appl. No.: 17/955,421

(22) Filed: Sep. 28, 2022

(65) Prior Publication Data
US 2024/0106813 A1    Mar. 28, 2024

(51) Int. Cl.
*H04L 9/40* (2022.01)
*H04W 12/04* (2021.01)

(52) U.S. Cl.
CPC ........... *H04L 63/062* (2013.01); *H04W 12/04* (2013.01)

(58) Field of Classification Search
None
See application file for complete search history.

(56) References Cited

U.S. PATENT DOCUMENTS

| | | | |
|---|---|---|---|
| 11,831,655 B2* | 11/2023 | Lee | H04L 63/123 |
| 2001/0038695 A1* | 11/2001 | Kim | H04L 9/0852 |
| | | | 380/283 |
| 2006/0178131 A1* | 8/2006 | Huotari | H04W 12/0431 |
| | | | 455/410 |
| 2009/0164663 A1* | 6/2009 | Ransom | H04L 45/00 |
| | | | 709/243 |
| 2011/0119489 A1* | 5/2011 | Garcia Morchon | H04L 63/062 |
| | | | 713/169 |
| 2012/0057697 A1* | 3/2012 | Holtmanns | H04N 21/6543 |
| | | | 380/42 |
| 2012/0328103 A1* | 12/2012 | Feng | H04W 12/041 |
| | | | 380/270 |
| 2014/0165216 A1* | 6/2014 | Kwag | G06F 21/74 |
| | | | 726/30 |
| 2016/0239556 A1* | 8/2016 | Oh | H04L 67/06 |
| 2016/0315762 A1 | 10/2016 | Moon et al. | |
| 2017/0214717 A1* | 7/2017 | Bush | G05B 19/4185 |
| 2017/0255423 A1* | 9/2017 | Yoshida | G06F 3/1292 |
| 2018/0131511 A1* | 5/2018 | Taylor | H04L 9/0861 |
| 2018/0183581 A1 | 6/2018 | Elbaz et al. | |
| 2019/0239033 A1* | 8/2019 | Douglas | H04W 4/06 |
| 2020/0296099 A1 | 9/2020 | Shanbhogue et al. | |

(Continued)

FOREIGN PATENT DOCUMENTS

KR   10-2015-0131696 A   11/2015

*Primary Examiner* — Kaveh Abrishamkar
(74) *Attorney, Agent, or Firm* — Volpe Koenig

(57) ABSTRACT

A method and system for distributing keys in a key distribution system includes receiving a connection for communication from a first component. A determination is made whether the first component requires a key be generated and distributed. Based upon a security mode for the communication, the key generated and distributed to the first component.

20 Claims, 3 Drawing Sheets

(56) References Cited

U.S. PATENT DOCUMENTS

2020/0374130 A1   11/2020  Strong et al.
2021/0352110 A1*  11/2021  Huffman ................. H04L 63/02
2022/0303763 A1*   9/2022  Guo ..................... H04W 12/03

* cited by examiner

METHOD AND SYSTEM FOR DISTRIBUTING KEYS

BACKGROUND

A memory management module, employed by an operating system of a computing system, provides applications with a contiguous memory space, namely, a virtual memory space. The physical memory storage that supports the virtual memory space can be provided by various memory devices, either internal to the computing system (e.g., main memory) or external to it (e.g., hard disk). The memory management model is designed to facilitate efficient utilization of the available virtual memory space, carrying out operations such as allocation of memory blocks for applications or migration of memory blocks to reduce fragmentation.

In such memory spaces, keys (e.g., encryption keys) are used for device secured booting, software decryption/inscription and authentication, secure session communication with peers over standard interfaces, and content protection (e.g., digital write management).

BRIEF DESCRIPTION OF THE DRAWINGS

A more detailed understanding may be had from the following description, given by way of example in conjunction with the accompanying drawings wherein.

DETAILED DESCRIPTION

Figure 1:
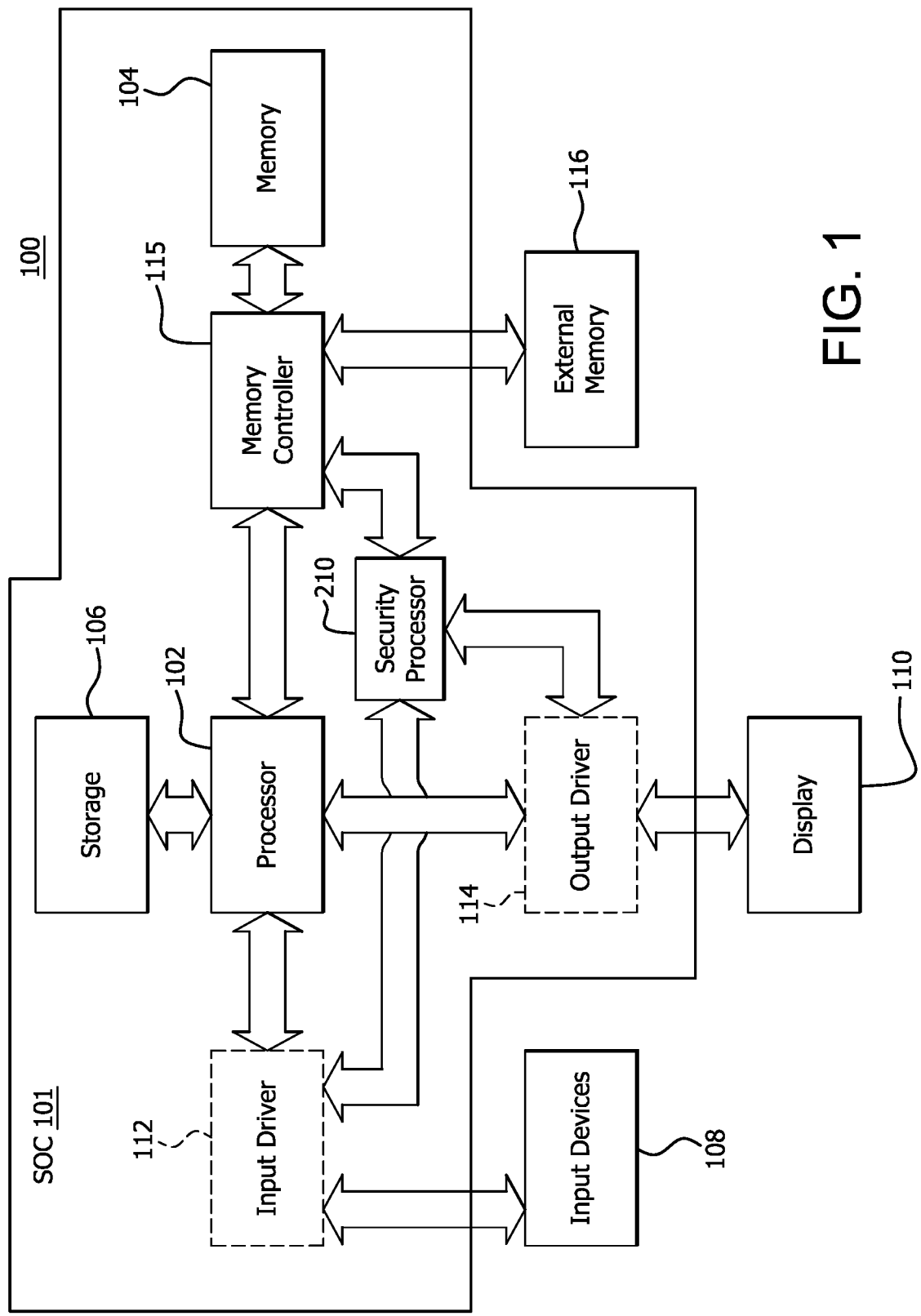
FIG. 1 is a block diagram of an example device, based on which one or more features of the disclosure can be implemented.

Systems and methods are provided for efficient management of diversified virtual memory by a diversified virtual memory (DVM) engine (also referred to herein as an engine). On behalf of a memory manager of an operating system (OS), the diversified virtual memory engine engages with various memory devices—including distributing commands to perform operations (requested by the memory manager) to the appropriate memory devices, in accordance with interface protocols required by the virtual memory managers (VMM) of the respective memory devices. The diversified virtual memory engine's circuitries are configured to distribute the commands in an order that is in accordance with their respective priority levels, and to combine commands that can be parallelized.

Although further detail is provided below, aspects disclosed in the present application describe a method and apparatus for distributing keys in a computer system. Generally, keys are used for device secured booting, software decryption/inscription and authentication, secure session communication with peers over standard interfaces, and content protection (e.g., digital write management).

For example, in order for a component connected to a computer system to communicate with another component, it may be necessary to that the communication be secure. That is, the contents of the communication are known only to the sending component and receiving component and cannot be deciphered by another component. In such a case, a key may be utilized to encrypt the communication such that the sending component and the receiving component are provided the key to decipher the communication, whereas a component not possessing the key will not be able to decipher the information in the communication.

In order to distribute the keys, a key distribution system, (e.g., over a private key distribution bus (PKDB)) is utilized to distribute keys securely from a processor such as a security processor to submodules. The submodules physical locations in a system on chip (SOC) may reside anywhere within the SOC. Accordingly, key distribution capability may be provided with the least amount of hardware use and clock resources.

Although described in additional detail below, a system on chip is a device where many components of an entire system are resident on a chip. For example, a system on chip may include a processor, memory, storage, input and output drivers, and other components on a single chip.

Further, as described in additional detail below, the private key distribution bus is therefore implemented as part of a separate system management network within the system on chip that may include a master security processor which creates and distributes keys and multiple slave modules that utilize keys, such as the submodules mentioned above.

A method for distributing keys in a key distribution system includes receiving a connection for communication from a first component. A determination is made whether the first component requires a key be generated and distributed. Based upon a security mode for the communication, the key generated and distributed to the first component.

A key distribution system includes a first module and a processor operatively coupled with and in communication with the first circuitry. The processor is configured to receive a connection for communication from a first component via the first module, determine whether the first component requires a key be generated and distributed, and based upon a security mode for the communication, generate the key and distribute the key to the first component through the first module.

A non-transitory computer-readable medium for distributing keys in a computer system, the non-transitory computer-readable medium having instructions recorded thereon that, when executed by the processor, cause the processor to perform operations. The operations include receiving a connection for communication from a first component. A determination is made whether the first component requires a key be generated and distributed. Based upon a security mode for the communication, the key generated and distributed to the first component.

FIG. 1 is a block diagram of an example device 100 in which one or more features of the disclosure can be implemented. The device 100 can include, for example, a computer, a server, a gaming device, a handheld device, a set-top box, a television, a mobile phone, or a tablet computer. The device 100 includes a processor 102, a memory 104, a storage 106, one or more input devices 108, and one or more output devices 110. For purposes of example, the output device 110 is shown as being a display 110, however, it is understood that other output devices could be included.

The device 100 can also optionally include an input driver 112 and an output driver 114. Additionally, the device 100 includes a memory controller 115 that communicates with the processor 102 and the memory 104, and also can communicate with an external memory 116. In some embodiments, memory controller 115 will be included within processor 102 Additionally, the device 100 includes a security processor 210 which will be described in further detail below, which is in communication with the input driver 112, output driver 114 and the memory controller 115. It is understood that the device 100 can include additional components not shown in FIG. 1.

As discussed above, the processor 102, memory 104, storage 106, input driver 112, output driver 114, memory controller 115 and security processor 210 may be included on a system on chip 101. Additionally, the memory controller 115 may include a processor, or processing circuitry, for performing operations.

In various alternatives, the processor 102 includes a central processing unit (CPU), a graphics processing unit (GPU), a CPU and GPU located on the same die, or one or more dies, wherein each processor die can be a CPU or a GPU. In various alternatives, the memory 104 is located on the same die as the processor 102, or is located separately from the processor 102. The memory 104 includes a volatile or non-volatile memory, for example, random access memory (RAM), dynamic RAM, or a cache.

The storage 106 includes a fixed or removable storage, for example, a hard disk drive, a solid state drive, an optical disk, or a flash drive. The input devices 108 include, without limitation, a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 include, without limitation, a display, a speaker, a printer, a haptic feedback device, one or more lights, an antenna, or a network connection (e.g., a wireless local area network card for transmission and/or reception of wireless IEEE 802 signals).

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. It is noted that the input driver 112 and the output driver 114 are optional components, and that the device 100 will operate in the same manner if the input driver 112 and the output driver 114 are not present.

The external memory 116 may be similar to the memory 104, and may reside in the form of off-chip memory. Additionally, the external memory may be memory resident in a server where the memory controller 115 communicates over a network interface to access the external memory 116. For example, the external memory may be a dynamic random access memory (DRAM) that is external to the system on chip 101. In addition, the external memory 116 may be external to the system 100.

Figure 2:
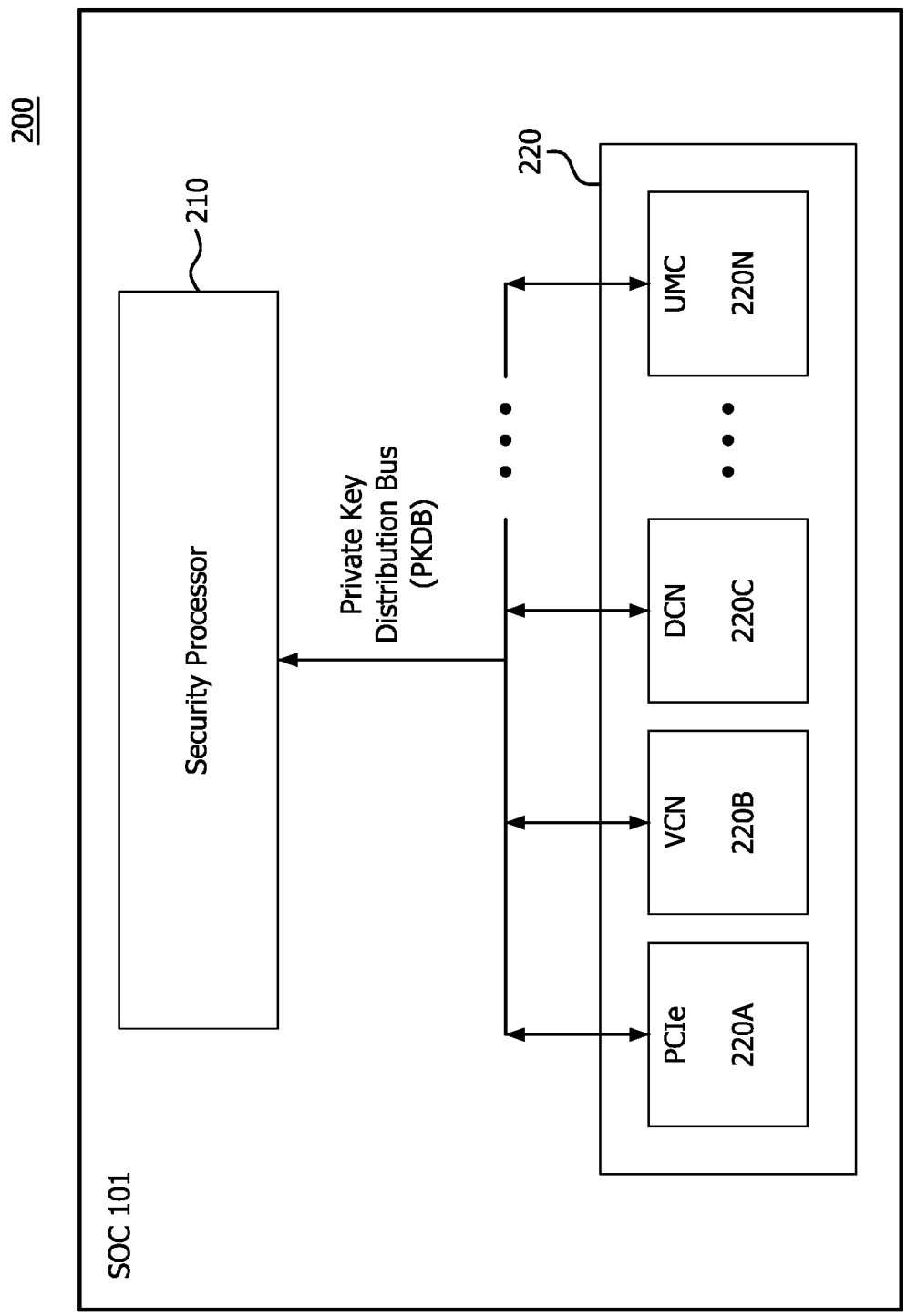
FIG. 2 is a block diagram of an example key distribution system in a system on chip, based on which one or more features of the disclosure can be implemented.

FIG. 2 is a block diagram of an example key distribution system 200, based on which one or more features of the disclosure can be implemented. The key distribution system 200 includes various components, which may be circuitry, software, or software controlled components. Additionally, in an example embodiment, the key distribution system 200 includes components that reside in the system on chip 101. For example, the key distribution system 200 is a subset of components that are resident in the system on chip 101.

That is, in an example embodiment as shown in FIG. 2, the key distribution system 200 includes a security processor 210. The security processor 210 allocates and distributes keys to components based upon a mode of operation of the security processor 210. For example, the security processor 210 may operate in a secured mode or an unsecured mode.

The security processor communicates with submodules 220 in order to provide keys over a dedicated bus, such as the private key distribution bus. The submodules 220 may include circuitry, software, or software controlled circuitry that is connected to a component that utilizes a key to function.

The submodules may 220 include, for example, a Peripheral Component Interconnect Express (PCIe) module 220A, a video core next (VCN) module 220B, a display core next (DCN) module 220C and a unified memory controller (UMC) module 220N. Each submodule 220 is connected to the security processor 210 in order to receive information from the security processor 210 as well as communicate to the security processor 210.

The PCIe module 220A, for example, may be a PCIe controller or PCIe network adapter. The PCIe module 220A may have PCIe devices attached to it, such as a video graphics card or a network card to connect to a network, for example. That is, in one example, a PCIe device may be a graphics accelerator card that is utilized for processing graphic images for display. In another example, a PCIe device may be a network interface card, such as a wireless network adapter card to allow connection to a wireless network. The PCIe module 220A may require a key in order to conduct secure communication, where a key is utilized to encrypt and decrypt data in the communication.

The video core next module 220B may be for a multi-media processor. For example, the video core next module 220B may be utilized for processing specific data associated with an application, such as processing a streaming service video stream. Each streaming service may include its own processing technique that is unique from a different streaming service. Accordingly, there may exist multiple video core next modules 220B for different streaming services which may receive data from a wireless network or the Internet, for example.

The display core next module 220C may be for a display driver. For example, the display core next module 220C may be utilized as an output driver (e.g., output driver 114) to control a display such as display 110. The display core next module 220C may control information to and from a display 110 in order to provide video or image information on the display 110 from the system 100. The display core next module 220C may require a key in order to permit the display 110 to display data that may be encrypted.

The unified memory controller 220N may, in an example, be the memory controller 115 as shown in FIG. 1. The unified memory controller 220N controls access to internal and external memory such as memory 104 and external memory 116. Read operations and write operations are controlled by the unified memory controller 220N to allow a device to perform a write to a memory area or a read from a memory area. Accordingly, the unified memory controller 220N module may require encryption to read or write encrypted data.

Although four example submodules 220 are shown in FIG. 2 (i.e., PCIe module 220A, video core next module 220B, display core next module 220C and unified memory controller module 220N), it should be understood that additional submodules (not shown) that may utilize keys can also be connected to the security processor 210 to receive keys for the submodules 220 to utilize for uses such as secure communication, among other uses as described above.

As discussed above, each of these submodules (e.g., PCIe module 220A) may require a key to enable operations such as secure communication, for example. The security processor 210 accordingly provides keys to the PCIe module 220A, video core next (video) module 220B, display core next (display) module 220C and unified memory controller module 220N, as well as any other module that may be connected to the security processor 210. The security processor 210 provides the keys over the secure dedicated private key distribution bus.

Figure 3:
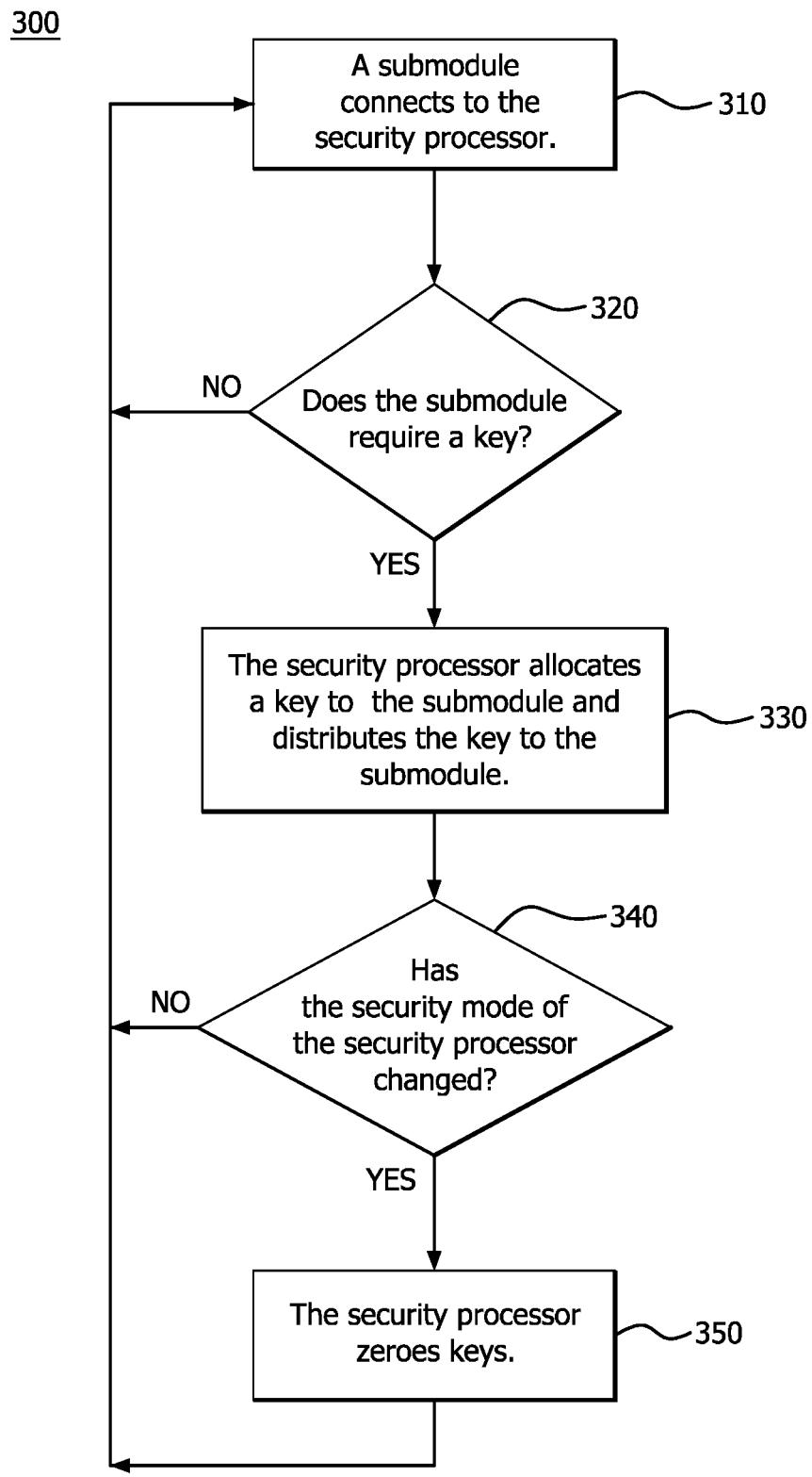
FIG. 3 is a flowchart of an example method for distributing keys, based on which one or more features of the disclosure can be implemented.

FIG. 3 is a flowchart of an example method 300 for distributing keys, based on which one or more features of the disclosure can be implemented. In step 310, a submodule 220 connects to the security processor 210.

For example, referring back to FIGS. 1 and 2, a PCIe component (e.g., a PCIe network card) may be connected to the overall system 100. Upon the connection, the PCIe module 220A connects to the security processor 210 via the private key distribution network shown in FIG. 2. The security processor 210 detects this connection upon the PCIe component connection with the PCIe module 220A via the private key distribution bus.

As mentioned above, the security processor 210 may operate in a secure mode or an unsecured mode. The security processor 210 may operate in a secure mode in a case where security is required. For example, where multiple connections of components that should remain isolated from one another are attached to the security processor 210, the security processor 210 may operate in a secure mode that requires keys for secure connections. It should also be noted that other reasons for having secure communication that are not described may be utilized by the security processor 210 to require keys.

Alternatively, the security processor 210 may be operating in an unsecured mode. In this mode, communications may not need to be secured by a key. For example, the security processor 210 may determine that components do not require isolation from one another and therefore secure communications are not required to be protected by a key. It should also be noted in this case, other reasons that are not described may be utilized by the security processor 210 to not require keys for secure communication.

Accordingly, based upon a security mode that the security processor 210 is in (e.g., secure mode or unsecured mode), the security processor 210 determines whether or not the submodule 220 requires a key (step 320). That is, it is determined, for example, by the security processor 210 whether or not the submodule 220 requires secure communication that is to be encrypted with a key.

If the submodule 220 is determined by the security processor 210 to require secure communication (step 320), then the security processor 210 allocates a key to the submodule 220 and distributes the key to the submodule (step 330). That is, for example, if the security processor 210 is operating in the secure mode, the security processor determines in step 320 that a key is required for the submodule 220 that has connected to the security processor 210.

The allocation includes, for example, determining a key size by the security processor 210 and any associated rules on the key use by the security processor 210. For example, the security processor may allocate a 4 byte key for use by the submodule 220 that has connected to the security processor 210. In addition, the security processor 210 may determine a rule such as the key is only permitted to be used, but may not be requested to be destroyed by the submodule 220.

Once the security processor 210 allocates a key size and key for use by the submodule 220, the security processor distributes the key by sending the key to the submodule 220 over the private key distribution network. In the example of a PCIe network card (e.g., wireless) connecting to the security processor 210 via the PCIe submodule 220A, the security processor 210 may determine that a particular size key is to be utilized for that component that is communicating wirelessly to an external device.

In this manner, the security processor 210 is in control of the generation/allocation of the key and the distribution of the key to components connected to the security processor 210 via the private key distribution bus. In addition, if the security processor 210 is not operating in the secure mode, the security processor 210 may allow connection by the submodule 220 that has connected to the security processor 210 and also allow communication between that connecting component and the system 100.

It is also possible that the mode of the security processor 210 may change from secure mode to unsecured mode, and vice versa. Should a change occur, depending on the mode the security processor 210 is operating in, the change in operation mode may require a change in key distribution.

Accordingly, in step 340, if the security mode of the security processor 210 changes, then the security processor 210 zeroes all keys that have been generated/allocated and distributed to any submodules 220 (step 350). That is, the security processor 210 destroys existing keys so the keys may no longer be used by a component if requested. For example, if the security processor 210 is operating in a secure mode and changes to an unsecured mode in step 350, the security processor destroys existing keys that have been distributed to any submodules 220. The destruction of the keys may include deleting generated/allocated keys and any associated rules for the use of those keys.

In the example described above relating to the connection of the PCIe network card, the security processor 210 may change from a secure operation mode to the unsecured operation mode. Upon changing modes, the security processor 210 may delete a key allocated and distributed to the PCIe submodule 220A for use by the PCIe network card. Accordingly, the PCIe network card would no longer utilize that key for secure communication.

Accordingly, as described above, a secure unidirectional key distribution system is described. The generation/allocation and distribution of keys are controlled by a security processor (e.g., 210) that is central in connection to one or more submodules (e.g., PCIe module 220A, video core next module 220B, display core next module 220C and unified memory controller module 220N).

The security processor 210 that generates/allocates the keys further distributes the keys over a secure network to a submodule 220 upon connection. In this manner, keys are not requested by connecting components to a system controlled by the security processor 210, but are only distributed by the security processor 210 to submodules 220 upon connection.

The keys may be zeroed (e.g., destroyed as described above) by the security processor 210 upon the changing of a mode of the security processor 210 from a secure mode to an unsecured mode. In this manner, the security processor 210 determines whether secured or unsecured communication is permitted in the system on chip 101 within the system 100. Further, the security processor 210 controls all the allocation and distribution of keys to the submodules 220 for use by component connected through the submodules 220 via the private key distribution bus.

Should the security processor be operating in a secure mode or changing from an unsecured mode to a secure mode of operation, then new keys generated and distributed by the security processor 210 to components connecting through a submodule 220 as those components connect to the security processor 210. Again, the security processor centrally controls all the allocation and distribution of keys to the submodules 220 for use by component connected through the submodules 220 via the private key distribution bus in the secure mode.

It should be noted again that any number of submodules 220 (e.g., components connecting through an associated submodule 220) can be added or removed from the key distribution system and the security processor 210 adjusts the generation and distribution of keys accordingly based upon the connection of components connected to the system 100 via the submodules 220. That is, should a component disconnect from the security processor 210, the key allocated and distributed to that component via the associated submodule 220 may be zeroed as described above. The security processor 210 controls the allocation and the distribution of keys over the private key distribution bus, which is isolated from components outside of security processor 210 and the submodules 220. The security processor 210 and submodules 220 may be implemented via circuitry, hardware, or software controlled hardware, for example.

It should be understood that many variations are possible based on the disclosure herein. Although features and elements are described above in particular combinations, each feature or element can be used alone without the other features and elements or in various combinations with or without other features and elements.

In addition, it should be understood that, although steps of the methods provided above are shown in a particular order, steps can be performed in a different order than shown. As described above, the method or methods provided above are example methods for distributing keys, based on which one or more features of the disclosure can be implemented. Accordingly, some steps may also be performed independent of others. That is, the methods described above may include one or more steps not being performed, or one or more steps performed simultaneously.

The methods provided can be implemented by system on chip components (of FIGS. 1 and 2) in a general-purpose computer, a processor, or a processor core. Suitable processors include, by way of example, a general-purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such as instructions capable of being stored on a computer readable media). The results of such processing can be mask works that are then used in a semiconductor manufacturing process to manufacture a processor which implements aspects of the embodiments.

The methods or flow charts provided herein can be implemented in a computer program, software, or firmware incorporated in a non-transitory computer-readable storage medium for execution by a general-purpose computer or a processor or hardware finite state machines. Examples of a non-transitory computer-readable medium include read only memory (ROM), random-access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method performed by a system on chip (SOC) for managing security keys, the method comprising:
   detecting, via a private key distribution bus of the SoC, that a device is connected to a first component of the SoC;
   in response to the detecting:
   generating a key based on the device requiring the key and a security mode of the SoC, and
   distributing, via the private key distribution bus of the SoC, the key to the first component; and
   selectively destroying the key in response to changes associated with the security mode.

2. The method of claim 1 wherein upon the security mode being a first security mode in operation for communication, the key is generated and distributed to the first component.

3. The method of claim 1 wherein a key size is selected for generation based upon a type of the device.

4. The method of claim 2, further comprising switching from the first security mode to a second security mode.

5. The method of claim 1, wherein the key is selectively destroyed when the security mode changes from a secure mode to a non-secure mode.

6. The method of claim 1, further comprising:
   destroying the key when the device is disconnected.

7. The method of claim 6, further comprising deleting an associated rule for the key generated for the first component.

8. The method of claim 1 wherein the first component includes one or more of a Peripheral Component Interconnect Express (PCIe) component, a video component, a display component or a unified memory controller component.

9. The method of claim 1, wherein the device is a video graphics card or a network card.

10. The method of claim 1, wherein the first component is a PCIe controller or PCIe network adapter.

11. A key distribution system, comprising:
    a first module;
    a private key distribution bus; and
    a processor communicatively the first module via the private key distribution bus,
    wherein the processor configured to:
    detect, via the private key distribution bus, that a device connected to the first module,
    in response to the device being detected:
    generate a key based on the device requiring the key and a security mode of the processor, and
    distribute, via the private key distribution bus, the key to the first module, and
    selectively destroy the key in response to changes associated with the security mode.

12. The key distribution system of claim 11 wherein upon the security mode being a first security mode in operation for communication, the key is generated and distributed to the first module.

13. The key distribution system of claim 12, further comprising the processor switching from the first security mode to a second security mode.

14. The key distribution system of claim 13 wherein the key is selectively destroyed when the security mode changes from a secure mode to a non-secure mode.

15. The key distribution system of claim 11 wherein a key size is selected for generation based upon a type of the device.

16. The key distribution system of claim 11 wherein the processor is further configured to destroy the key when the device is disconnected.

17. The key distribution system of claim 11 wherein the first module includes one or more of a Peripheral Component Interconnect Express (PCIe) component, a video component, a display component or a unified memory controller component.

18. The key distribution system of claim 11, wherein the device is a video graphics card or a network card.

19. A non-transitory computer-readable medium for managing security keys, the non-transitory computer-readable medium having instructions recorded thereon that, when executed by a processor of a system on chip (SOC), cause the SoC to perform operations including:
- detecting, via a private key distribution bus of the SoC, that a device is connected to a first component of the SoC;
- in response to the detecting:
  - generating a key for the first component based on the device requiring the key and a security mode of the SoC, and
  - distributing, via the private key distribution bus of the SoC, the key to the first component; and
- selectively destroying the key in response to changes associated with the security mode.

20. The non-transitory computer-readable medium of claim 19, wherein the device is a video graphics card or a network card.

\* \* \* \* \*